Dec. 8, 1959   R. V. KLINT   2,916,258
VIBRATION DAMPING
Filed Oct. 19, 1956
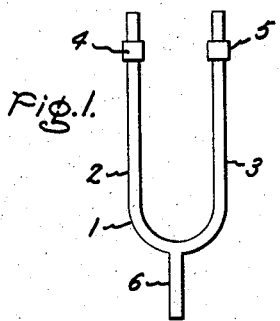
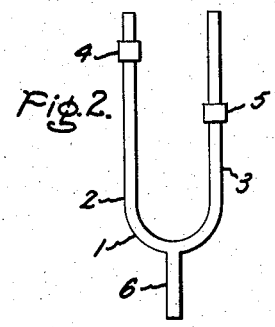
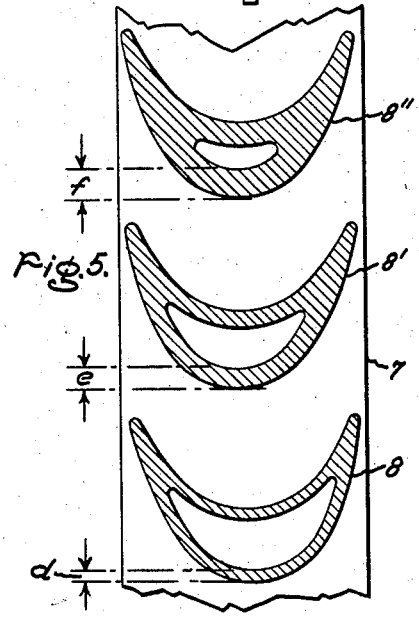
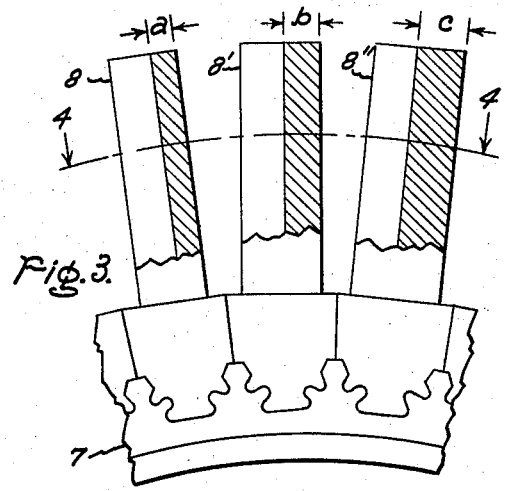
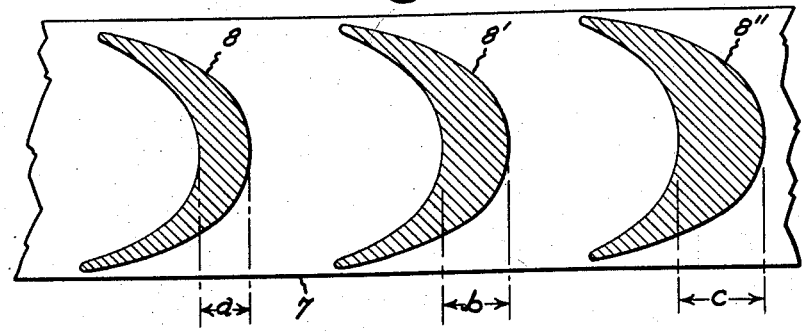
Inventor:
Robert V. Klint,
by Paul A. Frank
His Attorney.

United States Patent Office 2,916,258
Patented Dec. 8, 1959

2,916,258

VIBRATION DAMPING

Robert V. Klint, Vischers Ferry, N.Y., assignor to General Electric Company, a corporation of New York Application October 19, 1956, Serial No. 617,070

9 Claims. (Cl. 253—77)

This invention relates to vibration damping and in particular to vibration damping of buckets and blades as associated with gas turbines, steam turbines and the like rotary apparatus.

The presence of vibrations in the blading of various types of rotary apparatus may, if not controlled or damped, lead to severe stresses being imposed on the blades and wheel with resulting failure thereof and a transmittal of injurious vibrating forces to adjacent apparatus. Vibration problems are most serious when they occur at or near resonant frequency of the blades. Resonant frequency usually occurs at some determinable speed of the rotation, and therefore, such apparatus as aircraft gas turbines, which continually utilize a wide range of speed, are particularly prone to vibration damage to compressor and turbine blading in their frequent accelerations and decelerations through the resonant frequency stage. Furthermore, blade resonance may also be encountered at other than predetermined speeds through aerolastic effects such as blade flutter.

Previous solutions of the problem of blade damping generally entail employment of special weights, an enclosed fluid, or combinations thereof for the damping medium. These methods are relatively expensive since they require either additional parts to be manufactured or additional machining operations to be performed on the blade or the wheel.

Modern manufacturing processes produce turbine blades of extremely close tolerances in dimensions, weight, and weight distribution, and when mounted on a rotating wheel, the blading is subject to both rotational and fluid flow forces, which produce undesirable and potentially injurious vibration. Since the blades are quite similar in makeup, their natural periods of vibration will closely approximate each other, a condition which is generally referred to as a tuned system, and is one which will not only support sustained vibration, but which will also transfer or amplify existing vibrations of the blades which constitute the system.

An object of this invention is to dampen blade vibration through utilization of blading which represents an untuned system.

A further object of this invention is to provide blade vibration damping necessitating no additional parts to the basic blade.

A still further object of this invention is to provide a blade vibration damping system which requires no further supervision after initial installation.

Briefly stated, in accordance with one aspect of this invention, vibration damping is obtained through a selection of blades which constitute, with respect to their natural frequencies of vibration, an untuned system.

My invention will be better understood from the following description taken in connection with the accompanying drawing, and its scope will be pointed out in the appended claims.

Fig. 1 discloses a tuning fork having adjustable weights on the tines;

Fig. 2 discloses the tuning fork of Fig. 1 with the weights adjusted to different positions along the tines;

Fig. 3 is a view of a part of a turbine wheel and blade assembly showing a part of the blades in cross section;

Fig. 4 is an enlarged cross-sectional view of Fig. 3 taken on lines 4—4; and

Fig. 5 is a cross-sectional view similar to Fig. 4 showing a further embodiment of this invention.

Referring to Fig. 1, there is shown a schematic diagram of a common tuning fork 1, with tines 2 and 3. Carried upon these tines are adjustable weights 4 and 5, the weights being adjustable along the tines as shown in Fig. 2. If the weights are adjusted to the position shown in Fig. 1, and energy is imparted to the system by displacing and releasing tine 2, then tine 2 will vibrate of its own accord until the imparted energy is dissipated. Such dissipation or absorption of energy may take place through one or more of the following.

First, vibration of tine 2 may be dissipated by internal damping, a term describing, generally, such internal reactions as friction, alteration of grain structure and the like.

Second, vibrations of tine 2 commences a vibration in tine 3. This phenomena is due to a transfer of energy back and forth between tines. Some of this energy is transferred through the air space between blades through creation of sound waves of one blade and absorption by the other. However, this method transmits only a small amount of energy as compared to base participation.

Third, the energy may be dissipated through damping by base 6. Considering this method, if tines 2 and 3 are tuned by the adjustment of weights 4 and 5, to the same frequency, and energy is imparted to the system, then there is a transfer of energy from tine 2 to tine 3. This energy transfer is effected to a greater extent through base 6 and results in a sustained vibration of tine 3. When weights 4 and 5 are adjusted to the positions shown in Fig. 2, i.e., the natural frequencies of tines 2 and 3 are different, and the same quantity of energy is imparted to the system, tests have shown that the amplitude of vibration of tine 2 is less than that in the tuned system, and also, that the amplitude of vibration of tine 3 is of a lesser degree than in the tuned system. Test results further show that vibration is substantially less in an untuned system than in a tuned system. Damping effect in the untuned system is created largely by base participation in the vibration. Vibrations of tine 2 transmit a cyclic stress to base 6 which in turn attempts to vibrate tine 3. Tine 3, however, is untuned, in that its natural period of vibration differs from that of tine 2 and it is therefore not readily receptive to out of phase cyclic stresses. Thus, cyclic stresses are transmitted or absorbed by base 6 where, assuming base 6 to be a turbine wheel whose mass is large as compared with the blades, considerable internal damping takes place.

The damping effect of untuned blades may be obtained in turbine wheels and the like by several methods. While Figs. 1 and 2 show tuning forks having tines 2 and 3 upon which were mounted adjustable weights 4 and 5 suitable for testing purposes, such an arrangement is not too satisfactory for turbine or compressor wheels in that the assembly becomes unwieldy and expensive and the weights subtract from available blade working surface. Another method utilized for obtaining an untuned system relates to employment of blades of varying lengths and thus different natural frequencies. This system may entail some disadvantages such as shroud ring mounting, or the requirement of a special type wheel.

A preferred embodiment of this invention is Fig. 3, which discloses a method of obtaining untuned systems giving satisfactory results, and shows a partial section of a turbine wheel 7 having blades 8, 8′, 8″ mounted thereon. The individual blade cross-sections vary, in one instance in thickness at similar positions as shown by dimensions *a*, *b* and *c*, and this variance in connection with the corresponding weight differential produces blades having different natural periods of vibration. The progressive variance of these dimensions is more clearly shown in Fig. 4 where there has been a slight exaggeration for illustrative purposes. As a practical matter, this dimensional variance is not necessarily large since damping commences with the system being but slightly untuned and becomes largest when the system is untuned to the extent where base participation is a maximum.

The untuned turbine wheel is assembled by having blades marked, according to their natural frequencies, weight, or other acceptable marking and then placed on the wheel in such a manner that no particular blade has another of the same natural frequency in either the fore or aft direction. In multi-stage turbine wheels or compressor wheels, no blade with a particular natural frequency of vibration should be adjacent any blade of like frequency. However, it may be impractical in certain applications to have all blades of varying frequency and in such circumstances, the blades or small groups of blades of like frequencies should be mounted at spaced apart locations where the spaces are as large as possible. It is also to be noted that in assembling such a wheel the unbalanced condition which would result from the mounting of blades of different weights should be minimized as much as possible in the random dispersion of the blades and not left largely to extraneous wheel balancing means.

This invention is not restricted to blades of varying thicknesses since the invention contemplates such modifications including that the blades may also vary in chord length dimension to some extent, or, there may be variance in both chord length and thickness. Heretofore, vibration damping methods were generally restricted to the interior of blades or to those parts of the blade assembly not in the flow medium. It is apparent that any additions to the working surface of the blades would detract from the blade efficiency; however, the working surface is subjected to the largest amplitude of vibrations. Therefore, one of the primary advantages in the utilization of the aforementioned dimensions resides in the fact that these dimensions may be changed without causing any substantial change in the aerodynamic properties of blades. The primary advantage, however, is not confined to the dimensional change as described since its availability may also be attained by hollow blades of various wall thicknesses, i.e., different hollowness. In this manner no substantial change is made in the aerodynamic blade surfaces.

In the further modification of Fig. 5 there is shown a section of a turbine wheel similar to Fig. 4. Blades 8, 8′, and 8″ in this figure are generally considered hollow or have internal portions removed. In this respect the wall thickness of the blades varies as shown by the dimensions *d*, *e* and *f* which, by the corresponding weight differential, constitute an untuned system without any substantial change in the aerodynamic working surfaces of the blades being necessary.

It is to be understood that this invention is not limited to the specific embodiment herein illustrated and described, but may be used in other ways without departure from its spirit as defined by the following claims.

What I claim as new and desire to secure by Letters Patent of the United States is:

1. In a turbine and the like rotary apparatus the combination comprising a wheel, equal length blades mounted on said wheel in a circumferential row, each of said blades having a mass differing from that of the remaining blades in said circumferential row to constitute an untuned system which minimizes transmittal of vibrations between blades.

2. The invention as claimed in claim 1 wherein said wheel includes a plurality of said rows of blades.

3. In a turbine and the like rotary apparatus, the combination comprising a wheel, equal length blades mounted on said wheel in a circumferential row, each of said blades in said row being of a different cross-section at similar locations to constitute an untuned system which minimizes vibration transmittal between blades.

4. The invention as claimed in claim 3 wherein said wheel includes a plurality of said rows of blades.

5. The invention as described in claim 3 wherein said cross-sections vary in thickness.

6. The invention as recited in claim 1 wherein said blades increase in mass progressively in said row.

7. The invention as recited in claim 1 wherein said blades are randomly dispersed in said row.

8. The invention as recited in claim 7 wherein said blades are positioned in said row to provide balancing of said wheel.

9. In a turbine and the like rotary apparatus the combination comprising, a wheel, equal length hollow blades mounted on said wheel in a circumferential row, the wall thickness of said blades varying with respect to the corresponding wall thickness of adjacent blades, whereby the said blades constitute an untuned system to minimize vibration transmittal between blades.

References Cited in the file of this patent

UNITED STATES PATENTS

| | | |
|---|---|---|
| 995,517 | Barbezat | June 20, 1911 |
| 1,639,247 | Zoelly | Aug. 16, 1927 |
| 1,744,709 | Moody | Jan. 21, 1930 |
| 2,364,189 | Buchi | Dec. 5, 1944 |
| 2,381,459 | Merrick | Aug. 7, 1945 |
| 2,687,013 | Sinclair | Aug. 24, 1954 |

FOREIGN PATENTS

| | | |
|---|---|---|
| 308,991 | Switzerland | Oct. 17, 1955 |